United States Patent [19]

Anderson

[11] Patent Number: 5,042,615
[45] Date of Patent: Aug. 27, 1991

[54] PUMP JACK POLE

[76] Inventor: Carl Anderson, c/o Alum-A-Pole Corporation 2589 Richmond Ter., Staten Island, N.Y. 10303

[21] Appl. No.: 561,355

[22] Filed: Aug. 1, 1990

Related U.S. Application Data

[63] Continuation of Ser. No. 400,550, Aug. 30, 1989, abandoned.

[51] Int. Cl.$^5$ ................................................ E04G 1/20
[52] U.S. Cl. ................................. 182/136; 248/246; 403/381

[56] References Cited

U.S. PATENT DOCUMENTS

| | | | |
|---|---|---|---|
| 3,422,584 | 1/1969 | Howard | 52/718.1 X |
| 3,572,799 | 3/1971 | Truesdell | 52/718.1 X |
| 3,777,438 | 12/1973 | Brown | 52/718.1 X |
| 4,382,488 | 5/1983 | Anderson | 182/136 |
| 4,685,368 | 8/1987 | Gardner | 403/381 X |
| 4,727,695 | 3/1988 | Kemeny | 248/634 X |

Primary Examiner—Alvin C. Chin-Shue
Attorney, Agent, or Firm—Helfgott & Karas

[57] ABSTRACT

A pump jack pole is comprised of an elongated metal tube of rectangular configuration and a resiliently yieldable elastomeric strip which is secured to one side of the tubing. The tubing is comprised of an aluminum extrusion whereon there is formed a plurality of longitudinally extending closely-spaced plarallel protrusions. The strip is formed with a plurality of similarly spaced longitudinally extending grooves of complementary configuration to the protrusions which are interdigitated with the grooves.

26 Claims, 2 Drawing Sheets

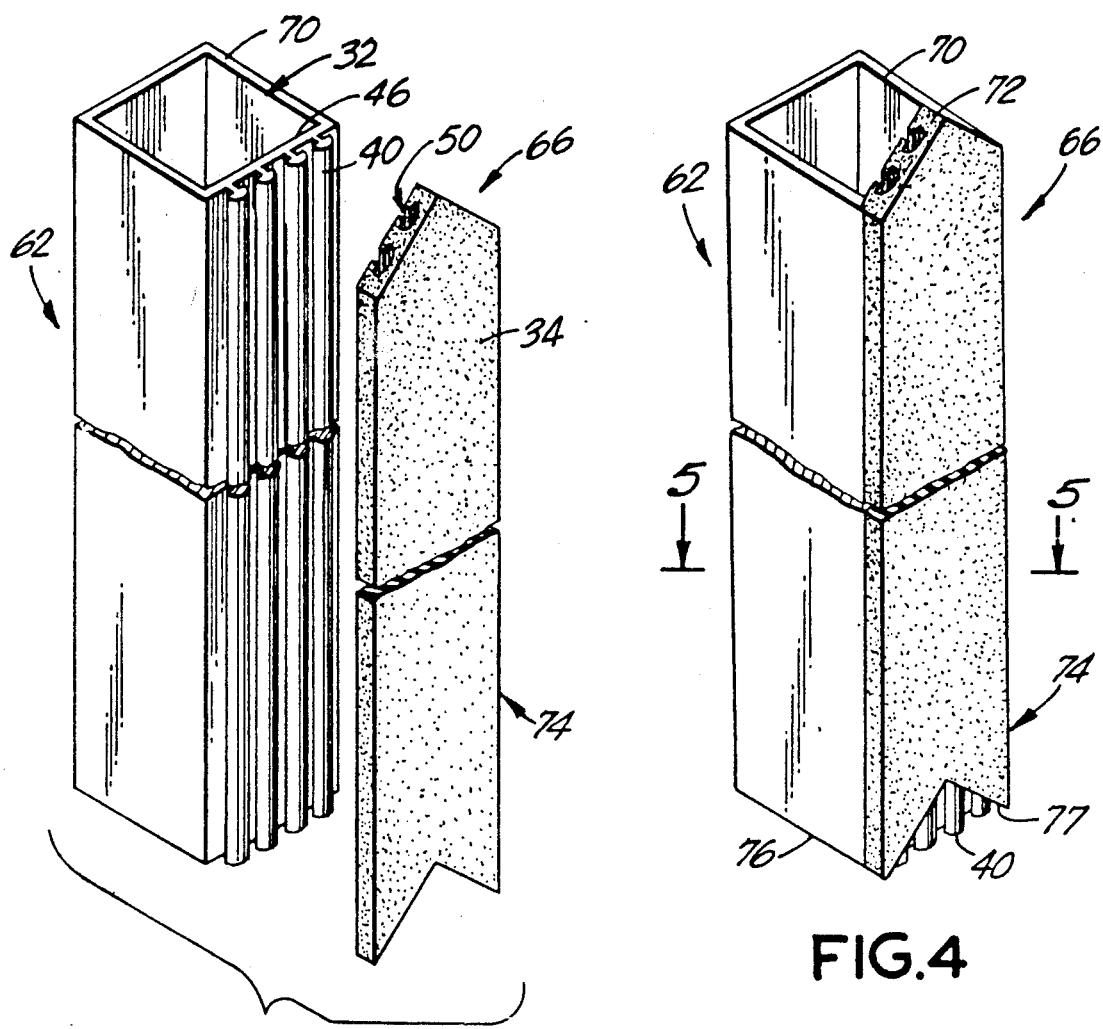
FIG.3
FIG.4
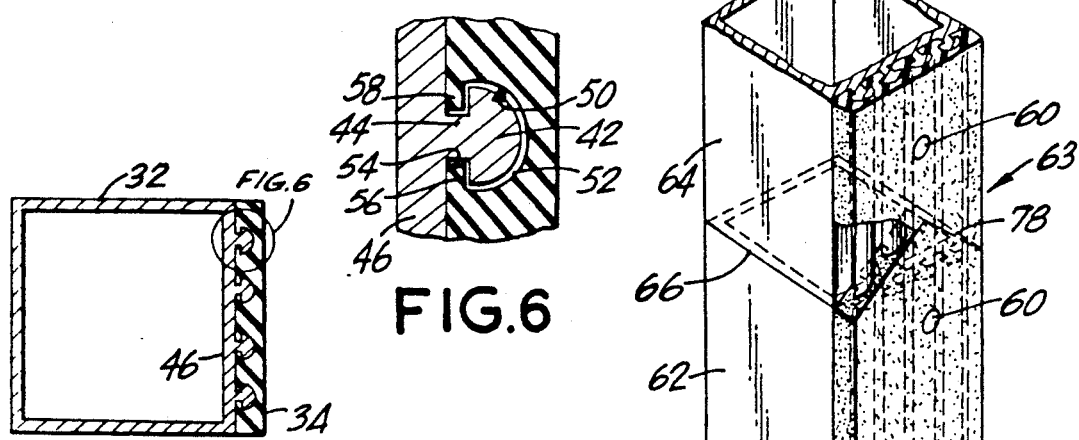
FIG.5
FIG.6
FIG.7

5,042,615

PUMP JACK POLE

This is a continuation of application Ser. No. 4,00,550, filed Aug. 30, 1989, now abandoned.

BACKGROUND OF THE INVENTION

The present invention relates to scaffolding equipment in general, and more particularly to upright poles utilized with pump jacks traveling up and down thereupon.

It has been customary in various industries, for example, while working on exteriors of houses, to erect scaffolding in order to permit workers to stand at an elevation above ground surface. Typically, scaffolding systems are utilized in installations of aluminum or vinyl siding. Such scaffolding systems utilize pump jack poles which are laterally spaced from each other and secured to the house by a brace. Pump jacks, which include support arms for supporting a scaffolding staging, and also include shackles which clamp onto the upright poles, are used to travel up and down the poles. Workers stand on the scaffolding staging and operate the pump jack by means of a foot pump to thereby move the staging up and down along the upright poles.

An improved pole used for pump jacks is described in my U.S. Pat. No. 4,382,488. Such poles are formed of metal tubing and have a rubberized surface provided on one side of the metal pole. The metal pole is preferably of rectangular cross-section and the rubberized material is secured to the face of the metal poles by adhesive and/or rivets. Securement of the rubberized material to the metal wall of the tubular pole must be reliable to support the weight of a worker when he stands on the staging with the shackles of the pump jack gripping the pole. In the aforementioned patent, it was shown that although the shackles of the pump jack clamps the pole on two opposing sides, only one of these need be covered by rubber to still provide adequate gripping of the pole and support the weight of workers on the scaffolding staging.

Due to substantial transmittal forces acting on the rubberized material when the worker's weight is applied to the staging, the adhesive connection between the rubberized strip and the metal pole must be secure. Using rivets in addition to the adhesive connection between the rubberized material and the metal wall of the pole improves the connection between the rubber and the metal pole. However, using rivets increases labor costs as well as material expenses in producing pump jack poles. Furthermore, should a submerged surface become damaged, it is not feasible to replace the rubberized section without the need for expensive equipment, time and cost.

Accordingly, there has been need to provide a secure connection between the rubberized surface and the metal pole and yet provide such securement with less expensive means than that of the prior art poles.

SUMMARY OF THE INVENTION

It is an object of the present invention to provide an improved pump jack pole of the type under discussion.

It is another object of the present invention to provide a pump jack pole in which a resiliently yieldable elastomeric surface or strip is reliably secured to the exterior side of the metal tubing of the pole by the means provided on the strip and the tubing themselves, without requiring the use of any adhesive or additional fasteners for connecting them to each other.

In brief, there is provided a pump jack pole which comprises an elongated metal tubing and a resiliently yieldable elastomeric strip which faces the metal tubing and is secured to the exterior side thereof. The tubing is formed with a plurality of longitudinally extending closely spaced parallel ribs, whereas the elastomeric strip is formed with a plurality of similarly spaced longitudinally extending grooves of complementary configuration to the ribs. The ribs and the grooves are interdigitated with one another so as to provide a secure connection between the strip and the metal tubing of the pole as the strip is pressed onto the tubing.

In an embodiment, each of the ribs has a head portion of generally semi-cylindrical configuration and integrally connected to the side of the tubing by means of a comparatively narrow neck portion. The corresponding shaped grooves include a pair of arms which matingly grasp either side of the neck to rigidly secure the elastomeric surface in place.

The resiliently yieldable elastomeric material can be a rubberized material such as rubberized belting or the like, or a polyurethane or the like. Hereinafter, the invention will be described in more detail utilizing rubberized material by way of example. However, it should be understood that other elastomeric material are included.

The aforementioned objects, features and advantages of the invention will, in part, be pointed out with particularity, and will, in part, become obvious from the following more detailed description of the invention, taken in conjunction with the accompanying drawing which forms an integral part thereof.

BRIEF DESCRIPTION OF THE DRAWING

In the drawing:

FIG. 3 is an exploded perspective view of the metal tubing and a rubberized strip of a section of the pump jack pole of FIG. 2;

FIG. 4 is a perspective view of the pump jack pole section with a joint portion of the rubberized strip extended beyond the pole section;

FIG. 5 is a cross-sectional view taken along line 5—5 of FIG. 4;

FIG. 6 is a detail 6 of FIG. 5, on an enlarged scale; and

FIG. 7 is a perspective view of two adjacent pump jack pole sections joined together.

DETAILED DESCRIPTION OF THE PREFERRED EMBODIMENTS

Figure 1:
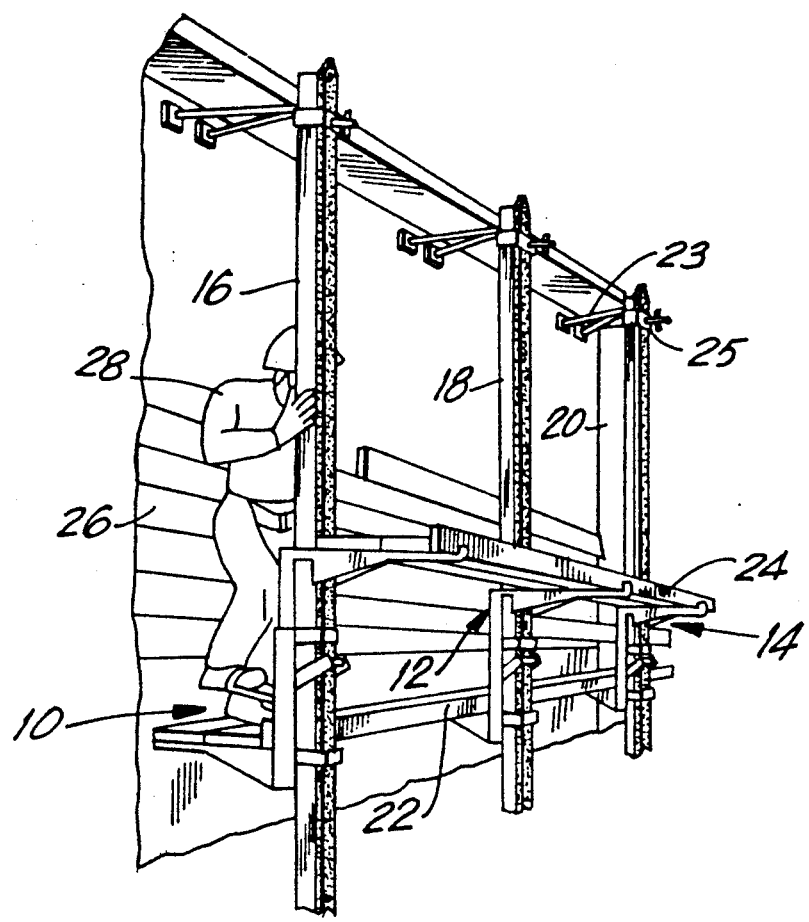
FIG. 1 is a perspective view of the pump jack pole of the preset invention utilized as part of a scaffolding arrangement.

Referring now to FIG. 1, there are shown three pump jacks depicted generally at 10, 12 and 14. Such pump jacks can be of a type described in my U.S. Pat. Nos. 4,413,828 or 4,597,471. Each pump jack is adapted to ride on an upright pole 16, 18 and 20, respectively and support a lower staging platform 22 and an upper shelf 24. The scaffolding is located as shown adjacent a building 26 on which a workman 28 is operating. The poles are retained in place by means of braces 23 of a type described in my U.S. Pat. No. 4,446,945 and a clamp 25 of a type described in my U.S. Pat. No. 4,432,435. The scaffolding can be used for various types of work on houses and buildings, for example placing aluminum or vinyl siding on the house walls, painting, etc.

Figure 2:
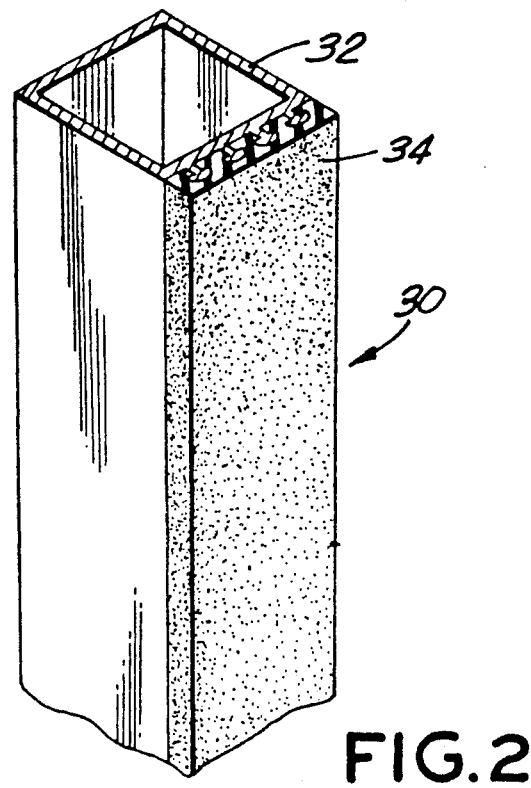
FIG. 2 is a perspective sectional view of a part of the pump jack pole according to the present invention.

Referring now to FIGS. 2 and 3, there is shown a pump jack pole 30 according to the present invention, which comprises an elongated metal tubing 32 of a substantially rectangular cross section to which is connected a rubberized strip or band 34. The latter is attached to only one side of the metal tubing 32 and is interconnected with the same by means which will be explained in detail below. All the aforementioned poles 16, 18 and 20 of the scaffolding arrangement of FIG. 1 are formed in the same manner as the pole 30.

As is known, while the pump jack is riding up and down the metal pole 30 it grabs into the rubber strip 34. Therefore, serious consideration has been given for providing means which would ensure sufficient security for tightly holding the pump jack on the pole. It has been found that the pump jack satisfactorily operated when only a single side of the metal pole is coated with the rubberized surface so that the pump jack would bite into the rubberized surface and grab the same as it moves up and down. Metal tubing 32 may be formed of aluminum extrusion of a substantially rectangular configuration.

As best seen in FIG. 3 as well as in FIGS. 5 and 6, the side of the metal tubing 32 to which rubber strip or band 34 is attached, is formed with a plurality of parallel outwardly extending elongated protrusions or ribs 40 each having a rounded enlarged head portion 42 of substantially semi-cylindrical configuration and a connecting or neck portion 44 which connects head portion 42 with a facing wall 46 of the aluminum tubing 32. Head portion 42 of each rib may typically be about 0.250" in diameter and about 0.172" in height whereas the neck portion may be about 0.125" in width and about 0.78" in height for the tubing side wall being about 2⅛" wide. The spacing between the ribs or protrusions 40 formed on the facing wall 46 of the tubing may be about 0.625" for the aforementioned wall width. All these dimensions would be with normal tolerances. The strip 34 of rubber is formed with a plurality of parallel complementarily-configured elongated grooves or recesses 50 each having, respectively, an enlarged portion 52 which receives the head portion 42 and a narrow portion 54 formed by two opposing inwardly extending arms 56, 58 which face each other to engage and grasp therebetween the neck portion 44 of the respective rib 40.

Strip 34 which may be made of any suitable resilient elastomeric material is simply pressed onto the facing wall of the aluminum tubing 32 of the pole whereby the ribs 40 and recesses 50 are interdigitated with each other thus providing a reliable and secure connection between the pole tubing 32 and strip 34. As the strip 34 is pressed onto the pole facing wall, the two opposite arms 56, 58 of each groove or recess tightly clamp around the neck portion 44 of each rib with some slight spacing allowed around the head portion 42 of each rib. The rubber strip 34 may be made of a rubberized belting material. In any event, the rubber strip is easy and relatively inexpensive to make from a continual band which is cut to desired lengths. Although it is possible to add a rivet 60 at the top and the bottom of each pole section (FIG. 7) as an extra precaution in order to prevent sliding between the rubber and the metal pole, such rivets are not a necessity and the interengaged ribs and complementary receiving grooves or recesses provided on the two facing walls of the metal tubing and the strip are sufficient to support the weight of an individual operating the pump jack as shown in FIG. 1. No adhesive is necessary between the rubberized strip and the metal pole tubing.

It should be appreciated that opposing arms 56 and 58 formed at each groove 50 act on the neck portion 44 of each rib engaged therebetween in a transversal direction. In this way sliding in the vertical direction of the rubber 34 relative to the metal pole 32, which can be caused by the worker's weight, is totally prevented even without utilization of rivets or any other fasteners. Furthermore, the rubber does not peel off the pole. This is a rather surprising result since the entire weight of the workers must be held by the rubber and its interconnection to the pole. It would have been thought that the weight of the worker would either cause the rubber to slide down the pole or peel off the pole. However, with the gripping of this interdigitated relationship, the rubber remains in place and supports the weight of the workers.

FIGS. 3 and 4 illustrate one pole section 62 of the pump jack pole whereas FIG. 7 shows a joint 63 of two interconnected pole sections 62 and 64. As shown in the drawings, the pole section 62 is formed as a male portion having a rubberized surface 66 which extends past the end 70 of the pole 62 to provide a flap 72. The other pole section 64 similarly contains a rubberized surface 74. This rubberized surface 74 represents the female end and terminates in spaced relationship from the end 76 of the pole 64. In fact, each pole is formed with a male and female end.

When the two pole sections 62, 64 are connected, the exposed flap 72 of pole 62 will overlie and can be pressed onto the female end 74 of the adjacent pole 64. This will cause the flap 72 to interlock with the corresponding V-shaped edge 77 of the rubberized surface 74 along a joint line 78. In order to provide a suitable joint at the rubberized surface, the joining edges are matingly beveled so that they will interfit with each other. The grooves of the flap 72 will be pressed onto the exposed ribs at the end 77 of the adjacent end. This will provide a smooth and planar rubber face even at the junctions. To provide structural support at the junction, a joint can be inserted interiorly of the poles as described in my U.S. Pat. No. 4,382,488.

In order to provide for a suitable interfitting of the mating edges of the rubberized surfaces, the ends can be cut at a suitable angle. The joint edge 78 is shown in an inverted V-shaped cut. This will permit suitable interfitting of the two edges to provide a smooth joint thereacross. When flap 72 fits into the inverted V-shaped cut of the female rubberized strip 74 all the ribs or tongues outwardly protruding from the wall of the metal pole 32 will be overlapped by the flap 72 of the male section. It is understood, however, that other types of angular cuts can be utilized, such as, for example, a diagonal cut completely crossing laterally the rubberized surface. Other interfitting mating joints can simply be utilized.

There has been disclosed heretofore the best embodiment of the invention presently contemplated. However, it is to be understood that various changes and modifications may be made thereto without departing from the spirit of the invention.

What is claimed is:

1. An upright pump jack pole comprising an elongated metal tubing having a rectangular cross-sectional configuration; and a resiliently yieldable elastomeric facing attached to one side of said tubing; said tubing and said facing having two abutting sides facing each other and each being formed with a plurality of elongated, continuous portions integrally made with a respective abutting side and outwardly projecting therefrom, said projecting portions of each abutting side being parallel to each other and extending along the entire height of said pole, said projecting portions on said facing sides abutting each other and mutually interengaging to securely connect an entire surface of said elastomeric facing which faces said tubing to said tubing so as to prevent slippage of said facing along said tubing and withstand the weight of a worker operating a pump jack to move along said pole the width of the elastomeric facing corresponding to the width of the pole to provide flush sides with the pole.

2. A pump jack pole as in claim 1, wherein said facing is a rubberized material.

3. A pump jack pole as in claim 2, wherein said facing is comprised of a rubberized belting material.

4. A pump jack pole as in claim 1, wherein said facing is comprised of a polyurethane material.

5. A pump jack pole as in claim 1, wherein said tubing is comprised of aluminum extrusion.

6. A pump jack pole as in claim 1, wherein said portions on said abutting side of said tubing are spaced-apart longitudinal protrusions, and said portions on said abutting side of said facing are longitudinal protrusions spaced by grooves complementary with and receiving said protrusions on said abutting side of said tubing.

7. A pump jack pole as in claim 6, wherein each of said protrusions of said tubing includes a neck portion adjacent to said abutting side of said tubing and a head portion outwardly extending from said neck portion and integral therewith, and each of said grooves includes a narrower portion formed by two opposing tongues tightly clamping said neck portion, and an enlarged portion receiving said head portion.

8. A pump jack pole as in claim 7, wherein said head portion is substantially semi-cylindrical.

9. A pump jack pole as in claim 7, wherein said neck portion is substantially rectangular in cross-section.

10. In combination, a pump jack riding up and down a pole; and an upright pump jack pole comprising an elongated metal tubing having a rectangular cross-sectional configuration, and a resiliently yieldable elastomeric strip, said strip and said tubing having two exterior sides thereof facing each other, each of said exterior sides being formed with a plurality of elongated non-interrupted portions made integrally with a respective exterior side and outwardly projecting therefrom, said portions being parallel to each other and extending along the entire height of said pole, said projecting portions on said exterior sides abutting each other and mutually interengaging to securely connect an entire surface of said elastomeric strip facing said tubing to said tubing so as to prevent slippage of said strip along said tubing and withstand the weight of a worker operating a pump jack to move along said pole the with of the elastomeric facing corresponding to the width of the pole to provide flush sides with the pole.

11. A combination as in claim 10, wherein said strip is comprised of a rubberized material.

12. A combination as in claim 10, wherein said strip is comprised of a polyurethane.

13. A combination as in claim 10, wherein said tubing is comprised of aluminum extrusion.

14. A combination as in claim 10, wherein said portions provided on the side of said tubing are parallel longitudinal protrusions and said portions provided on said strip are parallel longitudinal protrusions separated from each other by parallel longitudinal grooves complementary with said protrusions on the side of said tubing.

15. A combination as in claim 14, wherein each of said protrusions on the side of said tubing includes a neck portion adjacent to said facing side of said tubing and a head portion outwardly extending from said neck portion and integral therewith, and each of said protrusions on said strip includes a wider portion interengaged between neck portions of each two neighboring protrusions on the side of said tubing.

16. A combination as in claim 15, wherein said head portion is substantially semi-cylindrical.

17. A combination as in claim 15, wherein said neck portion is substantially rectangular in cross-section.

18. An upright pump jack pole comprised of an elongated metal tubing of rectangular configuration and a resiliently yieldable elastomeric facing strip secured to one side of the tubing, said tubing being comprised of an aluminum extrusion on a face of which there is formed a plurality of non-interrupted longitudinally extending closely spaced parallel ribs made integral with said tubing and outwardly protruding from the face thereof, said strip having a face facing said face of the tubing and being formed with a plurality of continuous spaced longitudinally extending portions made integral with said strip and outwardly protruding from the face thereof, said portions being spaced by elongated parallel grooves of complementary configuration to said ribs on the face of said tubing, said ribs on the face of the tubing and said portions on the face of said strip extending along the entire height of said pole and being interdigitated with one another to securely connect an entire surface of said strip facing said tubing with said tubing so as to prevent slippage of said strip along said tubing and withstand the weight of a worker operating a pump jack to move along said pole the width of the elastomeric facing corresponding to the width of the pole to provide flush sides with the pole.

19. A pump jack pole as claimed in claim 18, wherein said strip is comprised of a rubberized material.

20. A pump jack pole as claimed in claim 18, wherein said strip is comprised of a polyurethane material.

21. A pump jack pole as claimed in claim 18, wherein each of said ribs on the face of said tubing is formed with a head portion of generally semi-cylindrical configuration and is integrally connected to said side of said tubing by means of a comparatively narrow web.

22. An upright pump jack pole comprised of an elongated rectangular tubular aluminum extrusion and an elongated resilient strip facing said extrusion, one side of said extrusion being formed with a plurality of continuous parallel outwardly extending projections for engagement within complementary continuous parallel recesses formed within a body of the facing strip to be mounted thereon, said recesses being spaced from each other by elongated protrusions outwardly extending from a side of said strip facing said extrusion, said projections interengaging with said protrusions over entire facing surfaces of said extrusion and said strip so as to prevent slippage of said strip along said extrusion and withstand the weight of a worker operating a pump jack to move along said pole the width of the elastomeric facing corresponding to the width of the pole to provide flush sides with the pole.

23. A pump jack pole as in claim 1, wherein said pole is comprised of a plurality of sections joined together and having the elastomeric facings butting with each other.

24. A pump jack pole as in claim 23, wherein the butting sections of the elastomeric facings are matingly beveled so that an edge of the elastomeric facing of one pole section overlies the edge of the elastomeric facing of an adjacent section.

25. A pump jack pole as in claim 23, wherein the butting ends of the elastomeric facings are matingly cut along an angle with respect to the elongated axis of the poles.

26. A pump jack pole as in claim 25, wherein said angled forms a inverted V-shape.

* * * * *